United States Patent
Braam et al.

(10) Patent No.: US 7,031,737 B1
(45) Date of Patent: Apr. 18, 2006

(54) RAKE RECEIVER IN THIRD GENERATION MOBILE RADIOTELEPHONE SYSTEMS

(75) Inventors: Reinhold Braam, Rhede (DE); Andreas Falkenberg, San Diego, CA (US); Christoph Rohe, Bochum (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/830,623

(22) PCT Filed: Oct. 27, 1999

(86) PCT No.: PCT/DE99/03365

§ 371 (c)(1),
(2), (4) Date: Sep. 6, 2001

(87) PCT Pub. No.: WO00/25437

PCT Pub. Date: May 4, 2000

(30) Foreign Application Priority Data

Oct. 27, 1998 (DE) ................................. 198 49 556

(51) Int. Cl.
*H04Q 7/20* (2006.01)

(52) U.S. Cl. ...................... 455/518; 455/69; 455/522; 375/147; 375/148

(58) Field of Classification Search ................ 375/147, 375/148, 150; 455/14, 22, 39, 434, 518, 455/69, 132, 522

See application file for complete search history.

(56) References Cited

U.S. PATENT DOCUMENTS

| | | | |
|---|---|---|---|
| 5,303,261 A * | 4/1994 | Junod et al. ................. 375/214 |
| 5,654,979 A | 8/1997 | Levin et al. |
| 5,710,768 A | 1/1998 | Levin et al. |
| 6,011,787 A * | 1/2000 | Nakano et al. ............. 370/335 |
| 6,064,649 A * | 5/2000 | Johnston ................... 370/310.2 |
| 6,470,000 B1 * | 10/2002 | Burns et al. ................. 370/342 |

FOREIGN PATENT DOCUMENTS

GB  2 300 545  11/1996

* cited by examiner

*Primary Examiner*—Bing Q. Bui
(74) *Attorney, Agent, or Firm*—Bell, Boyd & Lloyd LLC

(57) ABSTRACT

To improve a rake receiver for telecommunication systems with wireless telecommunication between mobile and/or stationary transceivers, especially in third-generation mobile radio systems, compared with known rake receivers, such that savings with respect to the number of function blocks and logic gates used are possible, a pipeline architecture is provided in which the individual computing steps are processed as on a pipeline.

5 Claims, 5 Drawing Sheets

RAKE RECEIVER IN THIRD GENERATION MOBILE RADIOTELEPHONE SYSTEMS

BACKGROUND OF THE INVENTION

1. Field of the Invention

The present invention relates, generally, to a rake receiver for telecommunication systems with wireless telecommunication between mobile and/or stationary transceivers, and, more particularly, to such a rake receiver wherein a pipeline architecture having a number of pipeline stages is employed such that individual signal processing steps are processed as on a pipeline.

2. Description of the Prior Art

Telecommunication systems with wireless telecommunication between mobile and/or stationary transceivers are special communication systems with an information transmission link between a message source and a message sink in which, for example, base stations and mobile parts are used as transceivers for message processing and transmission and in which:

1) the message processing and message transmission can take place in a preferred direction of transmission (simplex mode) or in both directions of transmission (duplex mode);
2) the message processing is preferably digital; and
3) the message transmission via the long-distance link takes place wirelessly on the basis of various message transmission methods FDMA (Frequency Division Multiple Access), TDMA (Time Division Multiple Access) and/or CDMA (Code Division Multiple Access)—e.g., according to radio standards such as DECT [Digital Enhanced (previously European) Cordless Telecommunication; compare *Nachrichtentechnik Elektronik* 42 (1992) January/February No. 1, Berlin, DE, U. Pilger "*Struktur des DECT-Standards*" *[Structure of the DECT standard]*, pages 23 to 29 in conjunction with ETSI publication *ETS* 300175-1 . . . 9, October 1992 and DECT publication of the *DECT Forum*, February 1997, pages 1 to 16], GSM [Group Spéciale Mobile or Global System for Mobile Communication; compare *Informatik Spektrum* 14 (1991) June, No. 3, Berlin, DE; A. Mann. "*Der GSM-Standard—Grundlage für digitale europäische Mobilfunknetze*" *[The GSM standard—The basis for digital European mobile radio networks]*, pages 137 to 152 in conjunction with the publication *telekom praxis* 4/1993, P. Smolka "*GSM-Funkschnittstelle— Elemente und Funktionen*" *[GSM radio interface—elements and functions]*, pages 17 to 24], UMTS [Universal Mobile Telecommunication System; compare (1): *Nachrichtentechnik Elektronik*, Berlin 45, 1995 vol. 1, pages 10 to 14 and vol. 2, pages 24 to 27; P. Jung, B. Steiner: "*Konzept eines CDMA-Mobilfunksystems mit gemeinsamer Detektion für die dritte Mobilfunkgeneration*" *[Concept of a CDMA mobile radio system with joint detection for the third mobile radio generation]*; (2): *Nachrichten-technik Elektronik*, Berlin 41, 1991, vol. 6, pages 223 to 227 and page 234; P. W. Baier, P. Jung, A. Klein: "*CDMA—ein günstiges Vielfach-zugriffsverfahren für frequenzselektive und zeitvariante Mobilfunkkanäle*" *[CDMA—an advantageous multiple access method for frequency-selective and time-variant mobile radio channels]*, (3): *IEICE Transactions on Fundamentals of Electronics, Communications and Computer Sciences*, vol. E79-A, No. 12, December 1996, pages 1 930 to 1 937; P. W. Baier, P. Jung: "*CDMA Myths and Realities Revisited*"; (4): *IEEE Personal Communications*, February 1995, pages 38 to 47; A. Urie, M. Streeton, C. Mourot: "*An Advanced TDMA Mobile Access System for UMTS*"; (5): *telekom praxis,* 5/1995, pages 9 to 14; P. W. Baier: "*Spread-Spectrum-Technik und CDMA—eine ursprünglich militärische Technik erobert den zivilen Bereich*" *[Spread-spectrum technology and CDMA—a technology originally from the military domain conquers the civil domain]*, (6): *IEEE Personal Communications*, February 1995, pages 48 to 53; P. G. Andermo, L. M. Ewerubring: "*A CDMA-Based Radio Access Design for UMTS*"; (7): *ITG Fachberichte* 124 (1993), Berlin, Offenbach: *VDE Verlag ISBN* 3-8007-1965-7, pages 67 to 75; Dr. T Zimmermann, Siemens A G: "*Anwendung von CDMA in der Mobilkommunikation*" *[Application of CDMA in mobile communication]*, (8): *telcom report* 16, (1993), vol. 1, pages 38 to 41, Dr. T Ketseoglou, Siemens A G and Dr. T Zimmermann, Siemens A G: "*Effizienter Teilnehmerzugriff für die 3. Generation der Mobilkommunikation—Vielfachzugriffsverfahren CDMA macht Luftschnittstelle flexibler*" *[Efficient subscriber access for the 3rd-generation mobile communication—CDMA multiple access method makes the interface more flexible]*; (9): *Funkschau* 6/98: R. Sietmann "*Ringen um die UMTS-Schnittstelle*" *[Tug-of-war for the UMTS interface]* pages 76 to 81] WACS or PACS, IS-54, IS-95, PHS, PDC etc. [compare IEEE Communications Magazine, January 1995, pages 50 to 57; D. D. Falconer et al.: "Time Division Multiple Access Methods for Wireless Personal Communications"].

"Message" is a higher-level term which stands both for the meaning (information) and for the physical representation (signal). In spite of identical meaning of a message, that is to say identical information, different signal forms can occur. Thus, for example, a message relating to an object can be transmitted (1) in the form of an image,
(2) as a spoken word, or
(3) as a written word,
(4) as an encrypted word or image.

The type of transmission according to (1) . . . (3) is normally characterized by continuous (analog) signals whereas it is usually discontinuous signals (e.g. pulses, digital signals) which are produced with the type of transmission according to (4).

In the UMTS scenario (3rd-generation mobile radio or, respectively, IMT 2000), there are two part-scenarios, for example according to the printed document *Funkschau* 6/98: R. Sietmann "*Ringen um die UMTS-Schnittstelle*" *[Tug-of-war for the UMTS interface]*, pages 76 to 81. In a first part-scenario, the licensed coordinated mobile radio will be based on a WCDMA (Wideband Code Division Multiple Access) technology and operated in FDD (Frequency Division Duplex) mode as in GSM, whereas, in a second part-scenario, the unlicensed uncoordinated mobile radio will be based on a TD-CDMA (Time Division Code Division Multiple Access) technology and operated in TDD (Time Division Duplex) mode as in DECT.

For the WCDMA/FDD operation of the universal mobile telecommunication system, the air interface of the telecommunication system in each case contains a number of physical channels in the uplink and downlink direction of telecommunication in accordance with the printed document *ETSI STC SMG2 UMTS-L1, Tdoc SMG2 UMTS-L1* 163/98: "*UTRA Physical Layer Description FDD Parts*" vers. 0.3, May 5, 1998, of which channels a first physical channel, the so-called Dedicated Physical Control Channel DPCCH, and a second physical channel, the so-called Dedicated Physical Data Channel DPDCH, are shown with respect to their frame structures in FIGS. 1 and 2.

In the downlink (radio link from the base station to the mobile station) of the WCDMA/FDD system by ETSI and ARIB, respectively, the Dedicated Physical Control Channel (DPCCH) and the Dedicated Physical Data CHannel (DP-DCH) are time-division multiplexed whereas in the uplink, an I/Q multiplex is done in which the DPDCH is transmitted in the I channel and the DPCCH is transmitted in the Q channel.

The DPCCH contains $N_{pilot}$ pilot bits for channel estimation, $N_{TPC}$ bits for fast power control and $N_{TFI}$ format bits which indicate the bit rate, the type of service, the type of error protecting coding, etc. (TFI=Traffic Format Indicator).

FIG. 3 shows, on the basis of a GSM radio scenario which includes, for example, two radio cells and Base Transceiver Stations arranged therein, a first base transceiver station BTS1 (transceiver) omnidirectionally illuminating a first radio cell FZ1 and a second base transceiver station BTS2 (transceiver) omnidirectionally illuminating a second radio cell FZ2, an FDMA/TDMA/CDMA radio scenario in which the base transceiver stations BTS1, BTS2 are connected or can be connected to a number of mobile stations MS1 . . . MS5 (transceiver) located in the radio cells FZ1, FZ2 by wireless unidirectional or bi-directional-uplink UL and/or downlink DL—telecommunication on corresponding transmission channels TRC via an air interface designed for the FDMA/TDMA/CDMA radio scenario. The base transceiver stations BTS1, BTS2 are connected in at familiar manner (compare GSM telecommunication system) to a base station controller BSC which handles the frequency administration and switching functions in controlling the base transceiver stations. The base station controller BSC, in turn, is connected via a Mobile Switching Center MSC to the higher-level telecommunication network; e.g., the PSTN (Public Switched Telecommunication Network). The mobile switching center MSC is the administrative center for the telecommunication system shown. It handles the complete call administration and, with attached registers (not shown), the authentication of the telecommunication subscribers and the location monitoring in the network.

FIG. 4 shows the basic configuration of the base transceiver station BTS1, BTS2 constructed as transceiver and FIG. 5 shows the basic configuration of the mobile station MS1 . . . MS5, also constructed as transceiver. The base transceiver station BTS1, BTS2 handles the transmitting and receiving of radio messages from and to the mobile station MS1 . . . MS5 and the mobile station MTS1 . . . MTS5 handles the transmitting and receiving of radio messages from and to the base transceiver station BTS1, BTS2. For this purpose, the base station has a transmitting antenna SAN and a receiving antenna EAN and the mobile station MS1 . . . MS5 has a common antenna ANT for transmitting and receiving which is controllable by an antenna switch AU. In the uplink (receiving path), the base transceiver station BTS1, BTS2 receives via the receiving antenna EAN, for example, at least one radio message FN with an FDMA/TDMA/CDMA component from at least one of the mobile stations MS1 . . . MS5 and the mobile station MS1 . . . MS5 receives in the downlink (receiving path) via the common antenna ANT, for example, at least one radio message FN with an FDMA/TDMA/CDMA component from at least one base transceiver station BTS1, BTS2. The radio message FN consists of a broadband spread-spectrum carrier signal modulated with an information item composed of data symbols.

In a radio receiver FEE, the received carrier signal is filtered and mixed down to an intermediate frequency which, in turn, is thereafter sampled and quantized. After analog/digital conversion, the signal, which has been distorted by multipath propagation on the radio path, is supplied to an equalizer EQL which largely equalizes (synchronizes) the distortions.

After that, a channel estimator KS attempts to estimate the transmission characteristics of the transmission channel TRC on which the radio message FN has been transmitted. The transmission characteristics of the channel are specified by the channel impulse response in the time domain. To be able to estimate the channel impulse response, a special supplementary information item in the form of a so-called midamble, which is designed as training information sequence, is assigned or allocated to the radio message FN at the transmitting end (by the mobile station MS1 . . . MS5 or, respectively, the base transceiver station BTS1, BTS2, in the present case).

The individual mobile-station-specific signal components, which are contained in the common signal, are equalized and separated in a known manner in a subsequent data detector DD which is common to all received signals. After the equalization and separation, the data symbols hitherto present are converted into binary data in a symbol-to-data converter SDW. After that, the original bit stream is obtained from the intermediate frequency in a demodulator DMOD before the individual time slots are allocated to the correct logical channels and, thus, also to the different mobile stations in a demultiplexer DMUX.

The bit sequence obtained is decoded channel by channel in a channel codec KC. Depending on the channel, the bit information is allocated to the control and signaling timeslot or to a voice timeslot and, in the case of the base transceiver station (FIG. 4), the control and signaling data and the voice data are jointly transferred to an interface SS responsible for the signaling and voice coding/decoding (voice codec) for transmission to the base station controller BSC. In the case of the mobile station (FIG. 5), the control and signaling data are transferred to a control and signaling unit STSE responsible for the complete signaling and control of the mobile station and the voice data are transferred to a voice codec SPC designed for voice input and output.

In the voice codec of the interface SS in the base transceiver station BTS1, BTS2, the voice data is in a predetermined data stream (e.g., 64-kbit/s stream in the direction of the network and 13 kbit/s stream in the direction from the network).

The complete control of the base transceiver station BTS1, BTS2 is performed in a control unit STE.

In the downlink (transmitting path), the base transceiver station BTS1, BTS2 sends via the transmitting antenna SAN, for example, at least one radio message FN with an FDMA/TDMA/CDMA component to at least one of the mobile stations MS1 . . . MS5 and the mobile station MS1 . . . MS5 sends in the uplink (transmitting path) via the common antenna ANT, for example, at least one radio message FN with an FDMA/TDMA/CDMA component to at least one base transceiver station BTS1, BTS2.

The transmitting path begins at the base transceiver station BTS1, BTS2 in FIG. 4, by control and signaling data and voice data received by the base station controller BSC via the interface SS being assigned to a control and signaling timeslot or a voice timeslot in the channel codec KC and these timeslots being coded in a bit sequence channel by channel.

The transmitting path begins in the case of the mobile station MS1 . . . MS5 in FIG. 5 by voice data received from the voice codec SPC and control and signaling data received from the control and signaling unit STSE being assigned to a control and signaling timeslot or a voice timeslot in the channel codec KC and these timeslots being coded in a bit sequence channel by channel.

The bit sequence obtained in the base station BTS1, BTS2 and in the mobile station MS1 . . . MS5 is, in each case, converted into data symbols in a data-to-symbol converter DSW. Following this, the data symbols are, in each case, spread with a subscriber-associated code in a spreader SPE. In the burst generator BG consisting of a burst assembler BZS and a multiplexer MUX, a training information sequence in the form of a midamble is then added to the spread data symbols in the burst assembler BZS for channel estimation and the burst information obtained in this manner is set to the correct timeslot in the multiplexer MUX. The burst obtained is then radio-frequency modulated, in each case, in a modulator MOD and digital/analog converted before the signal obtained in this manner is radiated at the transmitting antenna SAN or, respectively, the common antenna ANT via a radio transmitter FSE as radio message FN.

In CDMA-based systems, the problem of multiple reception, the so-called delay spread, in the presence of echoes can be solved in spite of the great bandwidth and the very small chip or bit times of these systems by combining the received signals with one another in order to increase the reliability of detection. Naturally, the channel characteristics must be known for this. To determine these, a pilot sequence common to all subscribers is used (compare FIGS. 1 and 2) which is additionally radiated independently and with increased transmitting power without modulation by a message sequence. Its reception provides the receiver with the information on how many paths are involved in the instantaneous situation of reception and what delay times are produced.

In a RAKE receiver, the signals coming in via the individual paths are acquired in separate receivers, the "fingers" of the RAKE receiver, detected and added together in an addition section weighted among each other after compensation for the delay times and the phase shifts of the echoes.

A RAKE receiver is used, in particular, for recovering digital data from a radio reception signal having a CDMA component. The signals superimposed via multipath propagation and distorted by the channel are recovered and the symbol energies of the individual propagation paths are accumulated.

The theory for the RAKE receiver has been sufficiently well investigated and is known (compare J. G. Proakis: "Digital Communications"; McGraw-Hill, Inc.; 3rd edition, 1995; pp. 728 to 739 and K. D. Kammeyer: "Nachrichtenübertragung" [Information transmission]; B:G. Teubner Stuttgart, 1996; pp. 658 to 669).

An object of the present invention is to specify a rake receiver for telecommunication systems with wireless telecommunication between mobile and/or stationary transceivers, especially in third-generation mobile radio systems, which exhibits a smaller number of function blocks and/or logic gates compared with known rake receivers.

Accordingly, the present invention has a pipeline architecture, including a number of pipeline stages (pipeline structure), which is implemented such that the individual signal processing steps or computing steps are processed as in a pipeline. As a result, the hardware circuits used can be used in time-division multiplex.

In an embodiment, it is advantageous to use three pipeline stages. It is also advantageous to buffer the processing in the pipeline stages via two registers if no direct pipelining is possible in the three pipeline stages because of different processing speeds in the pipeline stages.

In a first pipeline stage, the data (e.g., chips or subchips in the case of oversampling) are read out of a memory (e.g., a dual-port RAM (DP-RAM)). To be able to superimpose the symbols of the individual signal paths in the correct phase (code combining), the corresponding path delays must be taken into consideration. The addresses are also calculated in the first stage. The delay time is added to the current address in the form of an offset. There are, for example, "L" offsets, "L" corresponding to the number of fingers in the RAKE receiver and a different offset being needed in each clock period. Thus, the memory is accessed in every clock period.

Furthermore, the code generated by at least one code generator, the spreading code and/or the scrambling code required for descrambling, is multiplied by the current value from the dual-port RAM in the first pipeline stage. This operation is relatively simple since it only consists of sign operations and of two additional additions in the case of complex scrambling codes.

In addition, the soft handover is handled in the first pipeline stage. In the case of a soft handover, the RAKE receiver receives signals which have been sent with different scrambling and spreading codes from, for example, base transceiver stations. The maximum possible number of RAKE fingers must be shared out among the base transceiver stations in accordance with the quality of reception. For this reason, the code generators are switched in dependence on the RAKE fingers. The multiplexer performing the switching operates at a maximum of L*W MHz. To increase the number of base transceiver stations, further code generators can be added.

In the second pipeline stage, each value is multiplied by a weight. These weights are different for each finger and change with every clock period. In principle, they are repeated after "L" steps. In the case of an interpolation, the delta values are accumulated to form the weights.

In the last, third pipeline stage, the chip energies of the individual RAKE fingers are accumulated to form the symbol energy $U_{symb}$.

$$u_{symb} = \sum_{i=1}^{SF} \sum_{j=1}^{L} u_{ij}; \text{ where } SF = \text{spreading factor,}$$

$$L = \text{number of RAKE fingers.}$$

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
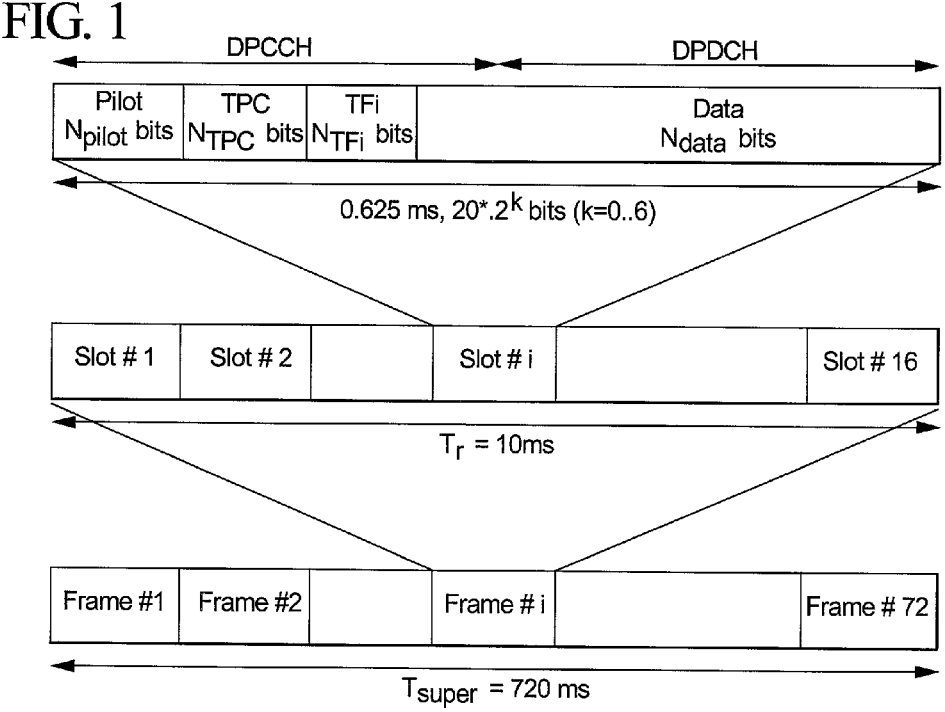
FIGS. 1 and 2 show, for the WCDMA/FDD operation of the universal mobile telecommunication system, the Dedicated Physical Control Channel and the Dedicated Physical Data Channel of the air interface of a telecommunication system with respect to their frame structures.

1. Time-Division Multiplexing of the RAKE Pipeline Architecture

In the known architectures, each finger of the RAKE receiver is implemented individually, the chips are accumulated to form symbols and, at the end, the sum over all fingers is formed. In the case of "L" fingers, this leads to the following hardware requirement:

L+1 adder and

2*L multipliers (complex multiplication)

If the signal processing chain for a RAKE finger is set up as a pipeline, a single pipelined RAKE finger can emulate a complete RAKE receiver in time-division multiplex. This is only limited by the number of fingers and maximum clock rate of the available technology. This reduces the complexity to 1 adder, 2 multipliers and b+2*m additional registers, where "b" is the maximum number of base transceiver stations involved in the soft handover and "m" is the number of fingers to be corrected for the early-late tracking.

2. Code Combing Via Dual-Port RAM Accesses

To be able to superimpose the symbols of the individual signal paths in the correct phase (code combining), the corresponding path delays must be taken into consideration. Various known approaches to a solution use shift registers and a relatively elaborate multiplexer logic for this purpose.

In the proposed approach to the solution, a simple dual-port RAM (DP-RAM) is used. Code combining is done by selectively using address offsets which correspond to the delay between the different propagation paths.

Instead of the dual-port RAM, SRAMs, SDRAMs or SSRAMs can also be used which emulate a DP-RAM.

3. Interpolation of the Weights

To reduce the number of channel estimations for calculating the conjugate complex coefficients (weights) or, respectively, to achieve a smaller time deviation from the ideal value of these estimations, it is possible to determine the coefficients between two estimations via interpolation. This simplification in the channel estimation can be easily integrated into the pipeline architecture.

4. Early-Late Tracking of the RAKE Fingers

The prerequisite for acceptable bit error rates is to position the RAKE fingers as accurately as possible. The position of the individual RAKE fingers is determined with the aid of an elaborate matched filter. The length of the channel, the required accuracy in the positioning of the fingers and the frequency of calculations performed determine the expenditure for the matched filter. Any more inaccurate, initial determination of the finger position performed at greater time intervals lead to a considerable reduction in the expenditure for the matched filter. To counteract the resultant degradation, the so-called early/late tracking is used. The early finger is positioned one half chip before, and the late finger one half chip after, the RAKE finger to be positioned (main finger). The energies of the early and late finger are calculated in the last stage of the RAKE receiver and only require little complexity. If the energies of the two fingers ≈0, i.e. they have approximately the same low energy, the enclosed finger, the main finger, has an almost optimum position. If the energies of the tracking fingers are not approximately equal or ≠0, a repositioning takes place at W/n intervals, "W" being the chip frequency and "n" being the oversampling rate.

5. Soft Handover

In the soft handover, the RAKE receiver receives signals sent with different scrambling/spreading codes from a number of base transceiver stations. The maximum number of RAKE fingers must be shared among the base transceiver stations in accordance with the quality of reception. This requires switching of the code generators which is dependent on the RAKE fingers. The multiplexer performing the switching operates with a maximum of L*W MHz, taking into consideration the early/late fingers.

Figure 2:
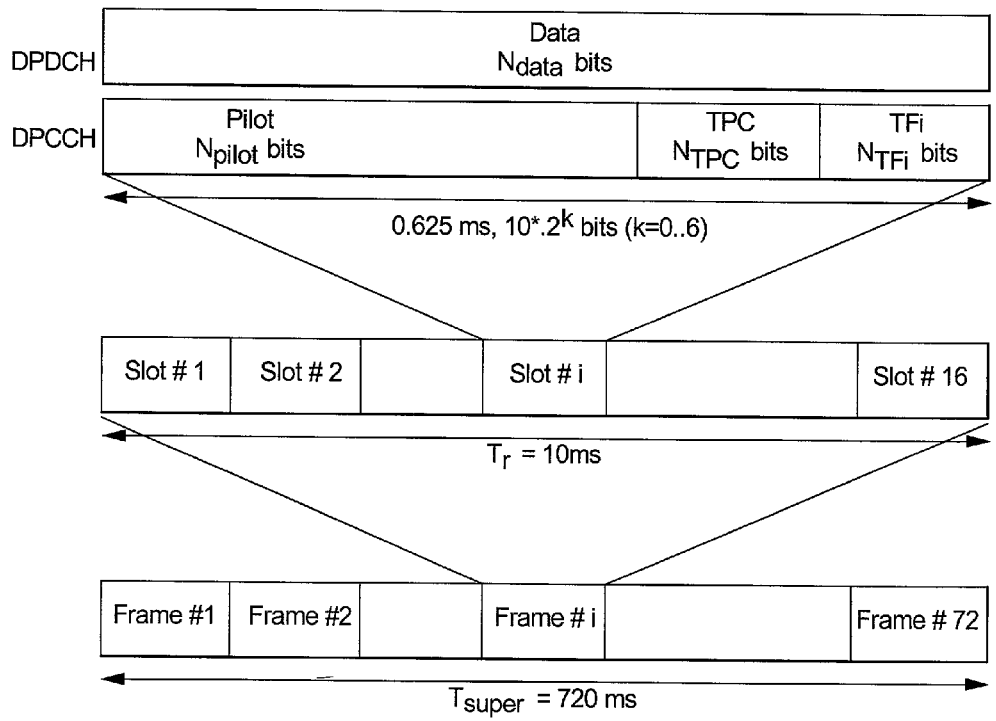
Figure 3:
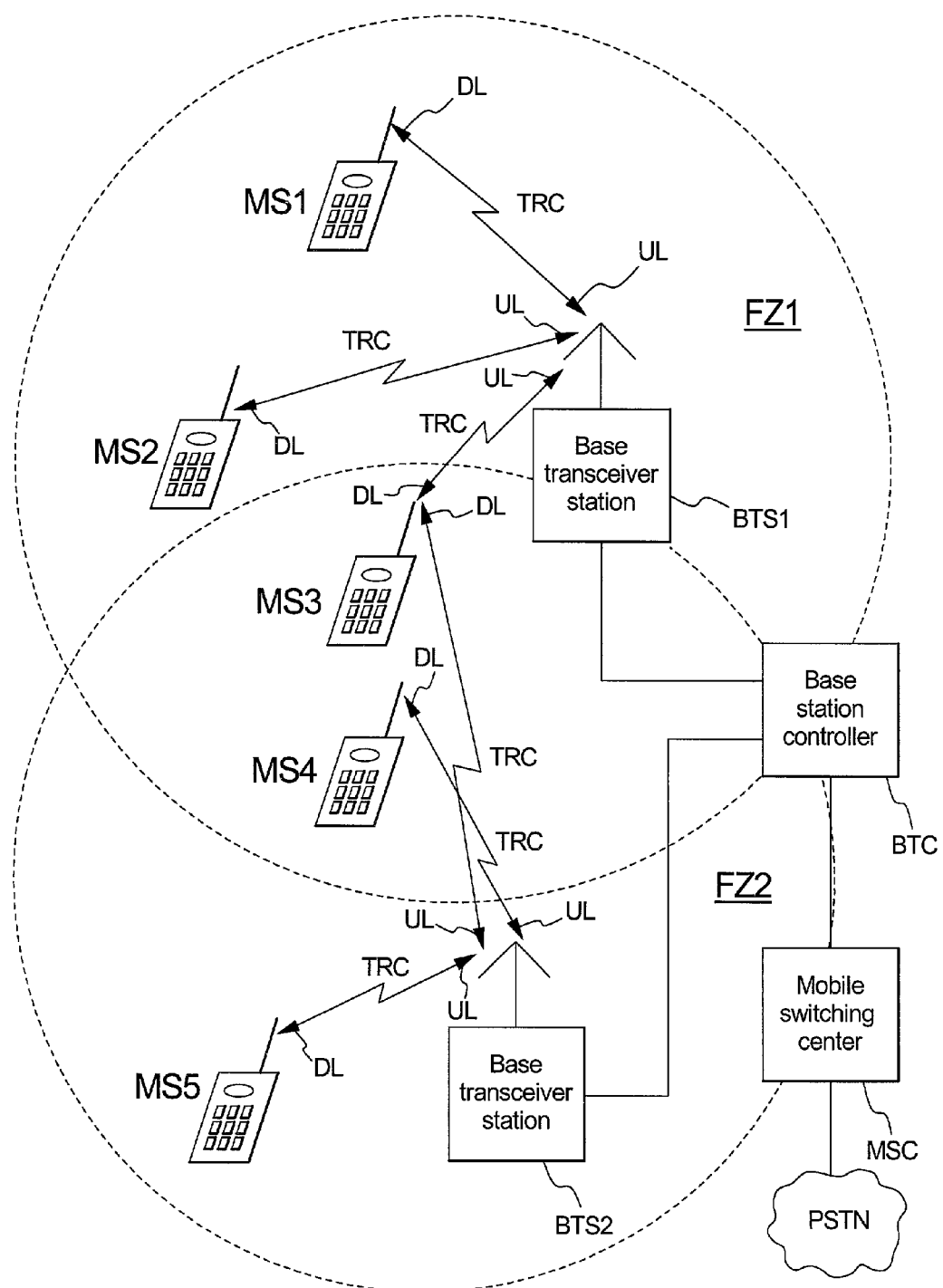
FIG. 3 shows, on the basis of the GSM radio scenario, first and second base transceiver stations.
Figure 4:
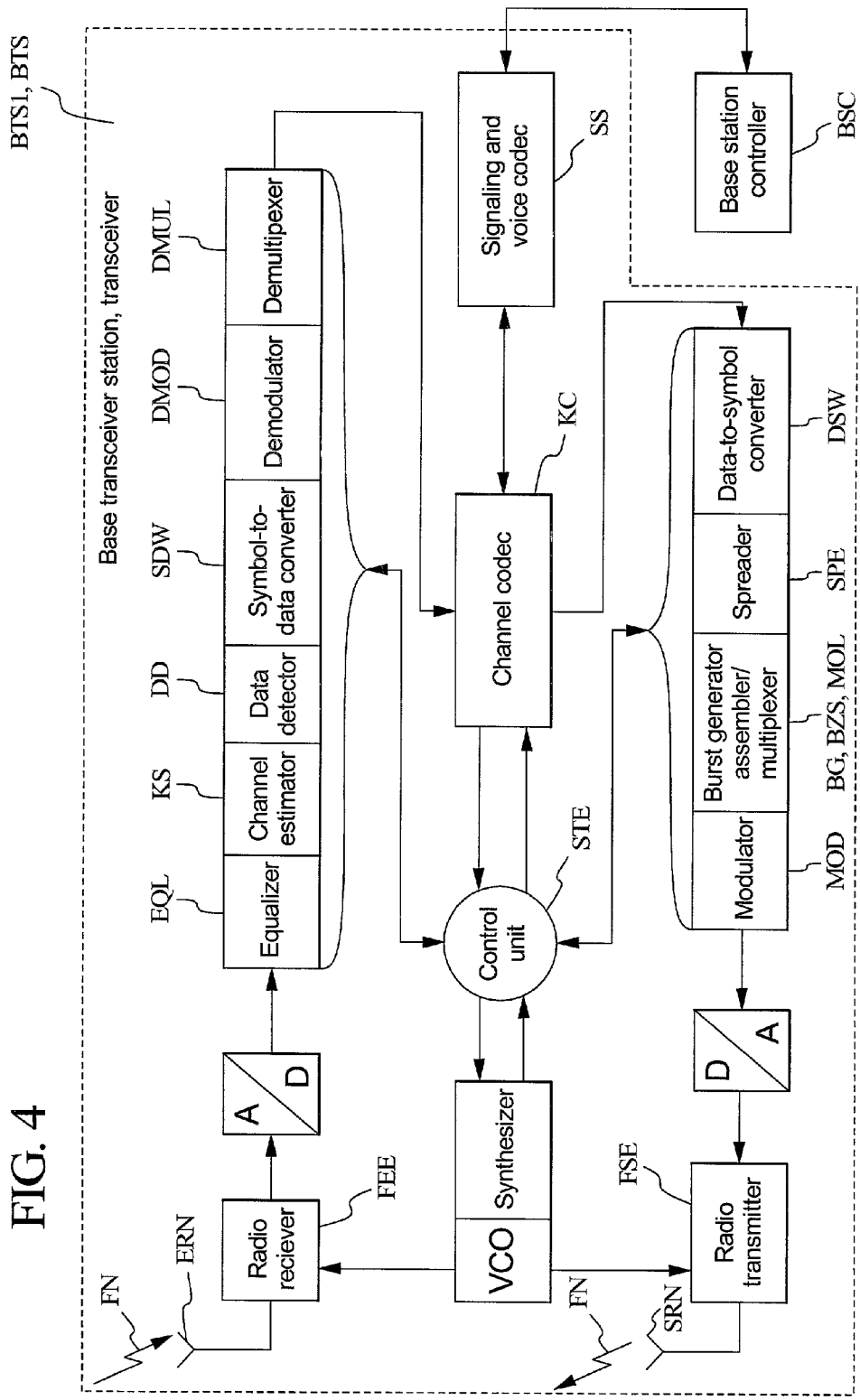
FIG. 4 shows the basic configuration of the base transceiver station constructed as a transceiver.
Figure 5:
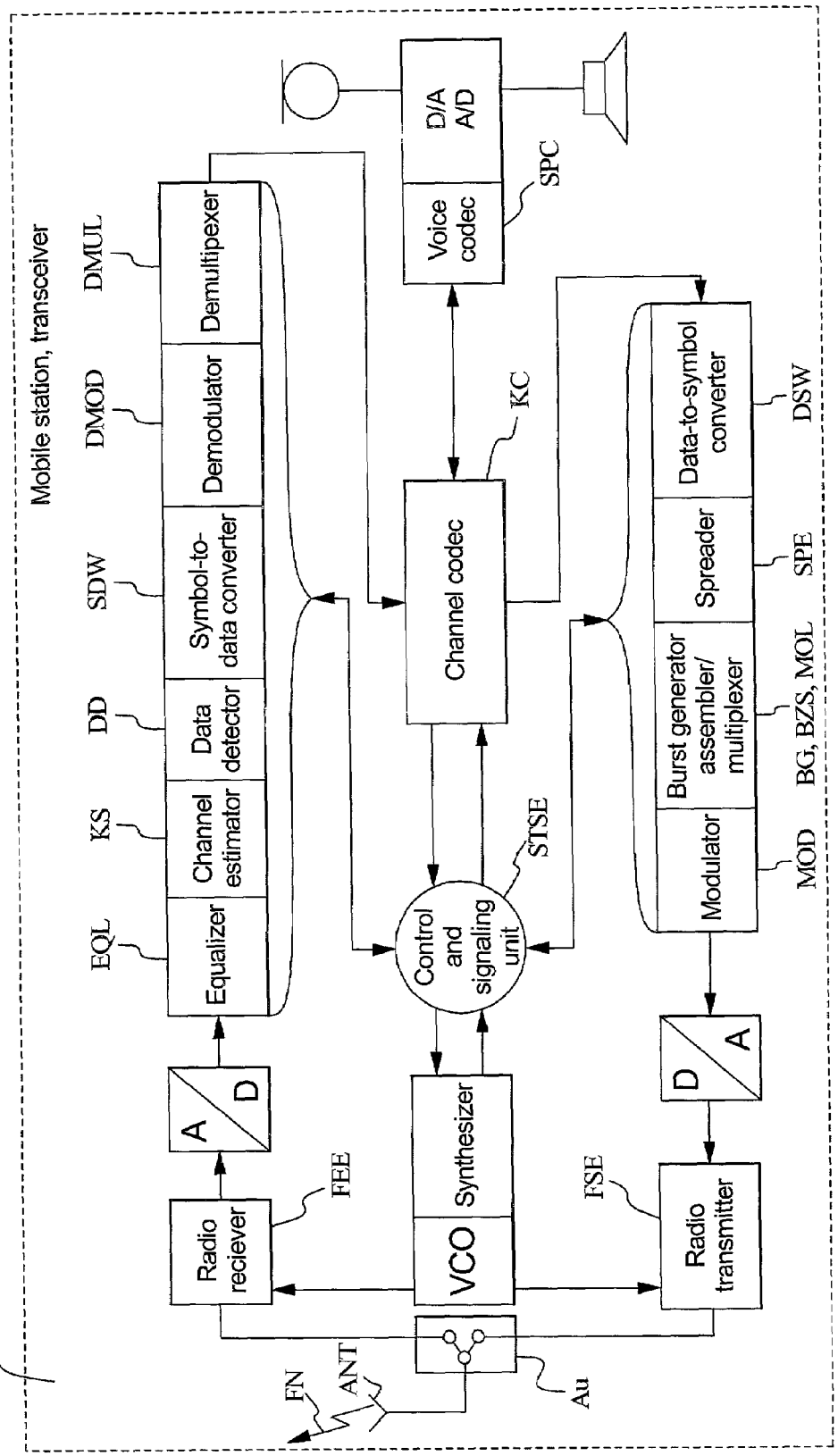
FIG. 5 shows the basic configuration of the mobile station constructed as a transceiver.

During the soft handover, the base transceiver stations involved send the same user data to the mobile station. To control the transmitting power of the mobile station, the latter additionally receives an information item, the so-called TPC (transfer power control, compare FIGS. 1 and 2) bit which says whether the transmitting power has to be increased or decreased. For this reason, the different base transceiver station-dependent TPC bits must be decoded. The concluding or last part of the processing pipeline accumulates for this purpose symbols representing TPC bits, separated in accordance with received base transceiver station.

6. Flexibility of the Architecture with Respect to Word Widths, Clock Rates and Parallel Processing Depending on the field of application and the quality required (e.g., bit error rate) of the communication link (data, voice, etc.), a different number of RAKE fingers and word widths are required in the signal processing path. The proposed architecture allows simple adaptation. Greater word widths require lower clock rates of the individual processing units, the technology remaining the same. The processing power of the RAKE pipeline architecture can be increased by inserting parallel processing branches without greatly increasing circuit complexity. This provides for higher clock rates.

In the implementation of a RAKE receiver in hardware and/or software, however, savings can be achieved with respect to the number of function blocks used or their complexity by suitable mapping in software and hardware, and a greater flexibility in the parametrization; e.g., number of RAKE fingers.

In addition, the availability of fast technologies in the field of chip design (e.g., ASIC, FPGA) allows essential parts of the hardware to be used in time-division multiplex and, thus, to reduce the necessary number of logic gates.

An exemplary embodiment of the present invention is explained with reference to FIG. 6.

Figure 6:
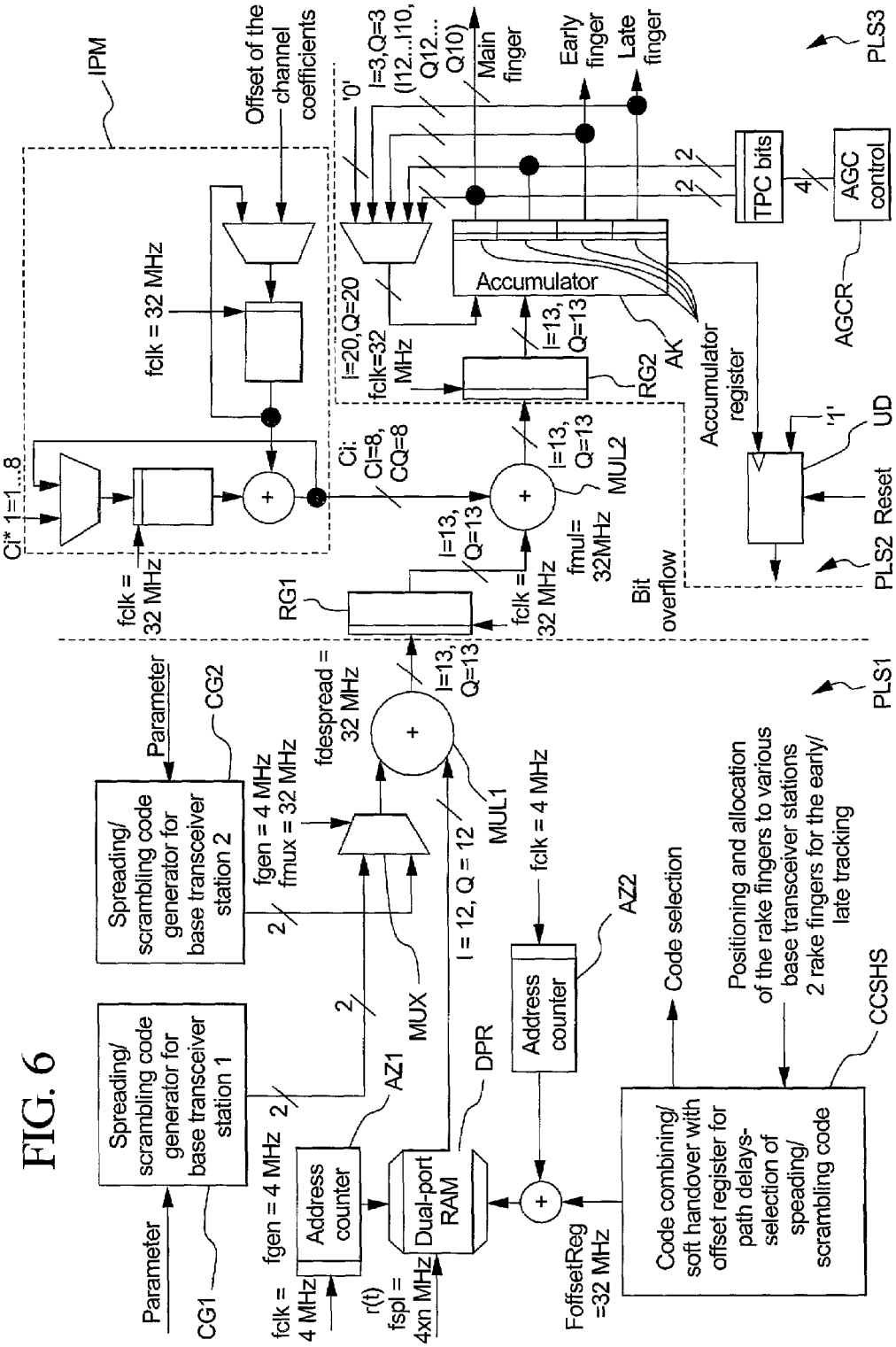
FIG. 6 shows, in block diagram form, rake receivers having a pipeline architecture.

FIG. 6 shows, in block diagram form, RAKE receivers having a pipeline architecture, consisting of three pipeline stages, a first pipeline stage PLS1, a second pipeline stage PLS2 and a third pipeline stage PLS3 for L=8 fingers, soft handover with two base transceiver stations and early/late tracking. The pipeline structure shown is designed for one finger, but all fingers can be successively corrected. The clock rates specified relate to the RAKE receiver thus specified and are, therefore, a multiple of the chip frequency of 4 096 MChip. The word widths specified within the signal processing chain are derived from the boundary conditions for UMTS standardization (compare *SMG2 UMTSPhysical Layer Expert Group: "UTRA Physical Layer Description FDD Parts"* vers. 0.4, Jun. 25, 1998).

In principle, the architecture described can be extended to a different chip frequency "W", to any number of fingers "L", to "b" possible base transceiver stations in the case of a soft handover and 2*L fingers for the early/late tracking. Similarly, the architecture is flexible with respect to the choice of word widths used in the signal processing path.

The received signal r(t) is written in a dual-port RAM (DP-RAM) DPR with a frequency of 4 096*n MHz (where n is the oversampling rate). The addresses for storing input data (chips) in the dual-port RAM DPR are generated by a first address counter AZ1.

To read the received chips out of the dual-port RAM DPR, an address (8* 4 096 MHz clock) is calculated from the addition of a free-running second address counter AZ2 and the offsets dependent on the RAKE finger. The offsets are located in offset registers. For the early/late finger tracking to be implemented, two of the offset registers can be used for positioning the early and late finger. To recover the symbols, the data read out is multiplied in a first multiplier MUL1 by a spreading code generated by at least one code generator (two code generators CG1, CG2 in FIG. 6) and/or a scrambling code required for descrambling. In the case of simple codes, this is a sign operation whereas an additional addition is added in the case of complex codes. MUX which perform. In the soft handover case, the RAKE receiver receives signals sent with different scrambling/spreading codes from, e.g., two base transceiver stations, base transceiver station 1 and base transceiver station 2. The maximum possible number of RAKE fingers must be shared among the base transceiver stations in accordance with the quality of reception. The scrambling/spreading codes are selected in a code combining/soft handover circuit CCSHS. This is why the code generators CG1, CG2 need to be switched in dependence on the RAKE fingers. A multiplexer MUX which performs the switching operates with a maximum of 8*4 096 MHz in this example. In addition, the corresponding path delays are taken into consideration in this circuit CCSHS to be able to obtain a superimposition of the symbols of the individual signal paths in the correct phase (code combining).

The channel necessary for transmission distorts the signal. In the second pipeline stage PLS2, the channel estimator calculates the conjugate complex channel coefficients (weights) necessary for correcting the distortion from the received pilot sequence. The receiver, therefore, multiplies the recovered symbols of the individual RAKE fingers by their weights $C_1^*$ in a second multiplier MUL2. These weights are stored in a ring memory.

To avoid frequent estimation of the channel because this is a computationally intensive process, and to achieve a smaller time deviation of the coefficients from the ideal value, the weights are interpolated between two estimations in interpolation part IPM. This results in continual adding together of delta values.

In the last pipeline stage, the third pipeline stage PLS3, the chip energies of the individual fingers and thus the levels belonging to a symbol are accumulated in an accumulator AK successively over the period of one symbol. Symbols which represent TPC (transfer power control) bits must be accumulated separated by received base transceiver station. After each symbol, the accumulator AK must be reset.

For the early/late tracking, two separate accumulator registers AKR must be additionally provided for each early/late finger.

For each timeslot, overflow detector ÜD registers a bit overflow produced and deletes it at the beginning of the new timeslot.

If an overflow occurs, an AGC control ACGR must be informed that the input gain must be decreased.

The estimated value of the symbol $\underline{U}_m$ is present at the output of the RAKE receiver.

The following expression represents the general calculation of the estimated value $\underline{U}_m$ of a received symbol:

$$\underline{U}_m = \int_0^T r(t) * \sum_{n=1}^{L} \underline{c}_n(t) * \underline{q}(t - n/W) dt$$

where r(t) is the received signal, $\underline{c}_n(t)$ is the weight and q(t) is the spreading/scrambling code. "L" describes the number of RAKE fingers and "1/W" is the duration of one chip.

In the pipeline structure with the three pipeline stages PLS1 . . . PLS3 shown, two registers RG1, RG2 are connected between the pipeline stages for data buffering because no direct pipelining is possible because of different processing speeds in the pipeline stages.

Although the present invention has been described with reference to specific embodiments, those of skill in the art will recognize that changes may be made thereto without departing from the spirit and scope of the invention as set forth in the hereafter appended claims.

We claim:

1. A rake receiver for telecommunication systems with wireless telecommunication between transceivers, the rake receiver comprising:
   a pipeline architecture including three pipeline stages in which individual signal processing steps are processed on a pipeline;
   registers operatively coupled to the pipeline stages for buffering data between the pipeline stages;
   a memory device operatively coupled to a first of the pipeline stages, wherein the first pipeline stage reads received chips from the memory device and calculates an address by adding a value from a free running addresses counter to at least one rake-finger dependant offset;
   an interpolator operatively coupled to a second of the pipeline stages to determine conjugate complex coefficients by interpolating between two channel estimations; and
   an accumulator operatively coupled to a third of the pipeline stages to provide early/late tracking of rake fingers.

2. The rake receiver as claimed in claim 1, further including a code combing/soft-handover-circuit which supports a soft handover in the first pipeline stage.

3. The rack receiver as claimed in claim 1, further including a code combing/soft-handover-circuit which provides code combing in the first pipeline stage.

4. The rake receiver as claimed in claim 1, wherein the pipeline architecture is flexibly adapted to word widths and clock rates by inserting parallel processing branches.

5. The rake receiver as claimed in claim 2, wherein the pipeline architecture is flexibly adapted to word widths and clock rates by inserting parallel processing branches.

* * * * *